(12) United States Patent
Toillon et al.

(10) Patent No.: US 11,381,419 B2
(45) Date of Patent: Jul. 5, 2022

(54) COMMUNICATION NETWORK

(71) Applicant: SAFRAN ELECTRONICS & DEFENSE, Boulogne Billancourt (FR)

(72) Inventors: Patrice Toillon, Boulogne Billancourt (FR); Francois Guillot, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/086,528

(22) PCT Filed: Feb. 15, 2017

(86) PCT No.: PCT/EP2017/053402
§ 371 (c)(1),
(2) Date: Sep. 19, 2018

(87) PCT Pub. No.: WO2017/162374
PCT Pub. Date: Sep. 28, 2017

(65) Prior Publication Data
US 2019/0109727 A1    Apr. 11, 2019

(30) Foreign Application Priority Data

Mar. 21, 2016 (FR) ..................... 16 52385

(51) Int. Cl.
*H04L 12/06* (2006.01)
*H04L 12/40* (2006.01)
(Continued)

(52) U.S. Cl.
CPC .... *H04L 12/40006* (2013.01); *H04L 12/4625* (2013.01); *H04L 43/062* (2013.01); *H04L 47/32* (2013.01); *H04L 2012/4028* (2013.01)

(58) Field of Classification Search
CPC ........... H04L 12/40006; H04L 12/4625; H04L 2012/4028; H04L 43/062; H04L 47/32
See application file for complete search history.

(56) References Cited

U.S. PATENT DOCUMENTS 6,779,038 B1 * 8/2004 Minyard ................. H04L 47/10
370/319
7,352,746 B1 * 4/2008 Sekihata ................. H04L 45/00
370/390

(Continued)

FOREIGN PATENT DOCUMENTS

| EP | 1309131 A1 | 5/2003 |
|----|------------|--------|
| EP | 2320603 A1 | 5/2011 |
| WO | WO2014124882 A1 | 8/2014 |

OTHER PUBLICATIONS

Toillon et al., "An optimized answer toward a Switchless Avionics Communication Network," 2015 IEEE/AIAA 34th Digital Avionics Systems Conference (DASC), Prague, 2015, p. 6D3-1-6D3-12.

*Primary Examiner* — Steven H Nguyen
(74) *Attorney, Agent, or Firm* — Muncy, Geissler, Olds & Lowe, P.C.

(57) ABSTRACT

The invention relates to a computing unit, a switch connected to the computing unit, a user terminal connected to the switch in such a way that the computing unit, the switch and the user terminal form a communication system with a central architecture, and at least one communication system with a distributed architecture that is connected to the switch. The switch is designed to be used as an intermediate system for the communication system with the central architecture as well as for the communication system with the distributed architecture.

5 Claims, 4 Drawing Sheets

(51) Int. Cl.
   *H04L 12/46*   (2006.01)
   *H04L 43/062*  (2022.01)
   *H04L 47/32*   (2022.01)

(56) References Cited

U.S. PATENT DOCUMENTS

| | | | |
|---|---|---|---|
| 7,808,891 B2* | 10/2010 | Law | H04N 7/17318 |
| | | | 370/217 |
| 2003/0076780 A1* | 4/2003 | Loge | H04Q 11/0478 |
| | | | 370/229 |
| 2006/0031748 A1* | 2/2006 | Brady, Jr. | H04N 21/2225 |
| | | | 715/201 |
| 2006/0174285 A1* | 8/2006 | Brady, Jr. | H04L 67/28 |
| | | | 725/76 |
| 2007/0071019 A1* | 3/2007 | Shimada | H04L 45/00 |
| | | | 370/401 |
| 2009/0034540 A1* | 2/2009 | Law | H04N 21/6402 |
| | | | 370/400 |
| 2016/0007169 A1* | 1/2016 | Margis | H04W 12/08 |
| | | | 370/329 |
| 2016/0294721 A1* | 10/2016 | Varadarajan | H04L 47/621 |

\* cited by examiner

COMMUNICATION NETWORK

The invention relates to a communication network, and more specifically a communication network for an aircraft.

BACKGROUND OF THE INVENTION

In the field of aeronautics, communications networks are used to support communications inside the aircraft, with such communications primarily, but not exclusively, providing for data exchange between the various avionics components.

Such communication networks include, in a central architecture, one or more computing unit(s) (computers, processors . . . ) connected to the avionics and communicating with user terminals via switches for providing data exchange within the same computing unit, between several computing units, or between a computing unit and a user terminal.

The communication networks may also include one or more communication system(s) with a distributed architecture connected to the computing units and/or the user terminals. To this end, for each communication system with a distributed architecture, one of the switches in the network is connected to a gateway which includes an end system (better known by the acronym ES) dedicated to such connection, with the gateway itself being connected to said communications system with a distributed architecture.

In such cases, the communication network must have a relatively heavy configuration to be able to provide the connection of the communication system with a distributed architecture with the rest of communication network.

PURPOSE OF THE INVENTION

One object of the invention is to provide a communication network having a simplified architecture.

BRIEF DESCRIPTION OF THE INVENTION

To reach this goal, a communication system for an aircraft is proposed, which comprises at least:
  a computing unit,
  a switch connected to the computing unit,
  a user terminal connected to the switch in such a way that the computing unit, the switch and the user terminal form a communication system with a central architecture,
  at least one communication system with a distributed architecture connected to the switch, the switch being designed to be used as an intermediate system for the communication system with a central architecture as well as for the communication system with a distributed architecture, with a portion of the input ports thereof and a portion of the output ports thereof being dedicated to an exchange of data with the communication system with a distributed architecture and a portion of the input ports thereof and a portion of the output ports thereof being dedicated to an exchange of data with the communication system with a central architecture, with the switch comprising a memory area in which all the data frames received on the input ports thereof prior to being retransmitted on the output ports of the switch are stored, with the switch being so configured as to operate in store and forward mode.
with the switch thus providing an exchange of data within the communication system with a central architecture, within the communication system with a distributed architecture and between the communication system with a central architecture and the communication system with a distributed architecture.

Advantageously, due to the particular structure of the communication network, and in particular of the switch, the switch is used as an intermediate system for the communication system with a distributed architecture so that the switch is directly connected to said communication system with a distributed architecture. A piece of equipment such as a connection gateway associated with end systems can thus be avoided, which simplifies the architecture of the communication network.

Advantageously, with such configuration, the communication system provides and maintains the integrity of the various frames exchanged in the communication network.

Furthermore, the segregation of switch ports, and therefore the associated logical channels makes it possible to limit the risk that a fault might spread from one communication system to another. Besides, any disturbance is thus avoided in the communications not concerned by the transition of data from one communication system to another.

In the present application, "intermediate system" means of course an "Intermediate System" or "IS" and "end system" means an "End System" or "ES".

In the present application "batch mode" means of course a "Store and Forward" mode.

BRIEF DESCRIPTION OF THE DRAWINGS

The invention will be better understood upon reading the following description of the specific although not restrictive embodiments of the invention while referring to the appended figures wherein.

DETAILED DESCRIPTION OF THE INVENTION

Figure 1:
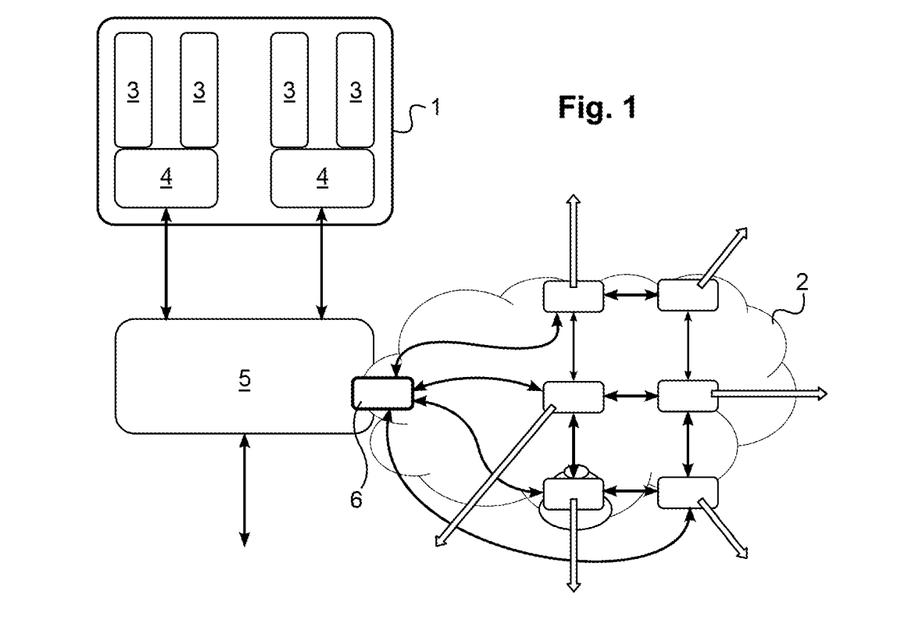
FIG. 1 schematically illustrates a communication network for an aircraft according to a first embodiment of the invention, FIG. 2 schematically illustrates a switch of the communication network shown in FIG. 1, FIG. 3 schematically illustrates a communication network for an aircraft according to a second embodiment of the invention, FIG. 4 schematically illustrates a communication network for an aircraft according to a third embodiment of the invention, FIG. 5 schematically illustrates a communication network for an aircraft according to a fourth embodiment of the invention, FIG. 6 schematically illustrates a communication network for an aircraft according to a fifth embodiment of the invention.

Referring to FIG. 1, the communication network according to the first embodiment of the invention is a communication network for an aircraft.

The communication network here includes a computing unit 1 associated with some avionics components on the aircraft (not shown here). The computing unit 1 is for example a computer or a processor or a group of computers and/or of processors. The computing unit 1 hosts multiple avionics applications-functions 3 to be executed, and such applications-functions 3 are specific, for a given configuration, to the avionics element associated with the computing unit 1. The computing unit 1 comprises, among others, connecting units 4, with each one being associated with one or more application(s)—function(s) 3 of the computing unit 1. The connection units 4 are here of the ARINC 664 P7 End System type.

The communication network also comprises a switch 5. The switch 5 is connected, on the one hand, to the computing unit 1 and on the other hand, either to another switch (not shown here) or directly to one or more user terminal(s) (not shown here) to control the data exchange between the different parts of the computing unit 1 and the data exchange between said computing unit 1 and the one or more user terminal(s).

The computing unit 1 and the switch 5 and possibly the user terminals here form a communication system with a central architecture.

The communication network also includes a communication system with a distributed architecture 2. Such a system is well known in the prior art and thus will not be disclosed in details here. The communication system with a distributed architecture 2 is connected to the switch 5 for transmitting data between the switch 5 and subscriber terminals to the communication system with a distributed architecture 2 (subscriber terminals not shown here).

The switch 5 is thus arranged to be used as an intermediate system for the communications system with a distributed architecture and is arranged to be used as an intermediate system for the communications system with a central architecture. The switch 5 is thus directly connected to the various communication systems of the communication network.

The connection can equally be wired or wireless between the computing unit 1, the switch 5, the communication system with a distributed architecture 2, the user terminals and the subscriber terminals.

Figure 2:
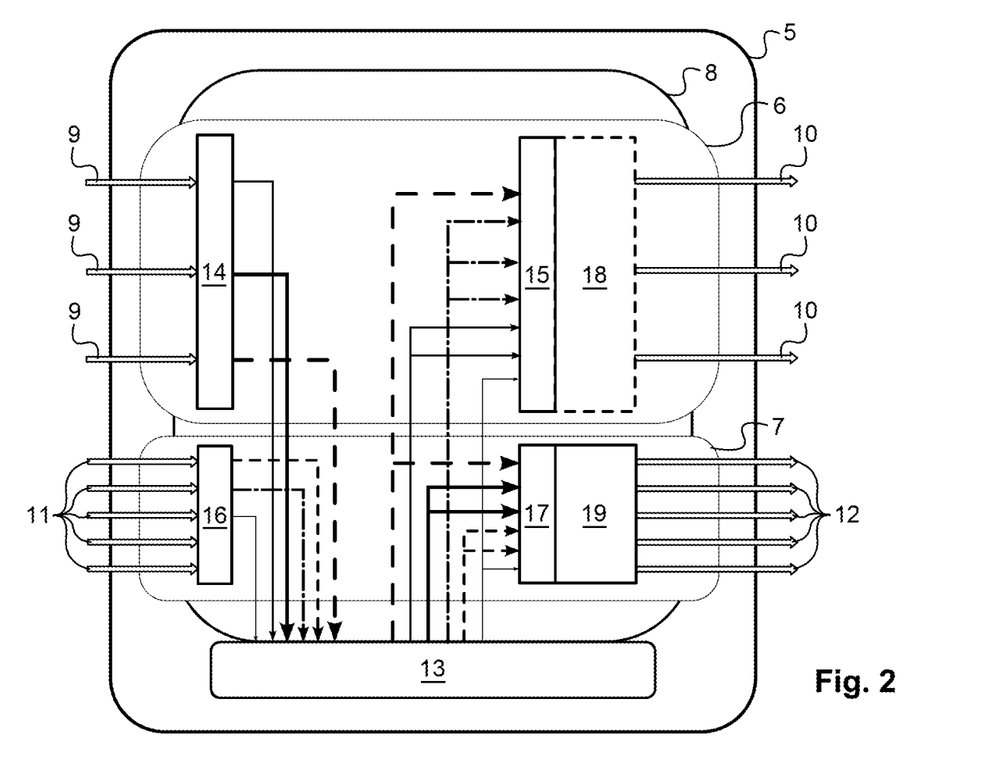

The switch 5 will now be described with reference to FIG. 2.

The switch 5 comprises a router 8 for relaying the data frames between one or more input port(s) of the switch 5 and one or more output port(s) of the switch 5. This router 8 is for example of the Switch Engine type.

The router 8 comprises an intermediate system 6 connected to the communication system with a distributed architecture 2 at three input ports 9 of the switch 5 and at three output ports 10 of the switch 5. The router 8 further comprises an intermediate system 7 connected to the communication system with a central architecture, here at the other input ports 11 of the switch 5 and the other output ports 12 of the switch 5. The input and output ports of the switch 5 are distributed among the two communication systems and are used individually by one of the two communications systems only.

For each communication system, the number of input ports of the switch 5 associated to the communication system considered here is equal to the number of output ports of the switch 5 associated to said considered communication system.

Moreover, here all the input and output ports are distributed among the two communication systems, with no port of the switch 5 thus remaining unused.

The switch 5 further comprises a memory area 13 which is central here. The switch 5 is so configured that all the data frames received on the input ports of the switch are stored in the memory area 13 before being retransmitted on the output ports of the switch 5. The switch 5 thus operates in store and forward mode.

This ensures the integrity of each received frame.

Preferably, each intermediate system 6, 7 of the router 8 comprises means for managing the data frames travelling through the router 8.

To this end, the managing means comprise, for the intermediate system 6, means for controlling the occurrence of the incoming frames 14 which are arranged between the input ports 9 and the memory area 13 and means for controlling the occurrence of outgoing frames 15 which are arranged between the memory area 13 and the output ports 10.

The control means 14, 15 are so configured as to monitor the occurrence of the respectively incoming frames on the input ports 9 of said intermediate system 6 and transmitted by the memory area 13 for emission on the output ports 10 of said intermediate system 6. The means for controlling the incoming frames 14 are so configured as to monitor all the incoming frames on all the input ports 9 and the means for controlling the outgoing frames 15 are so configured as to monitor all the frames transmitted by the memory area 13 for all the output ports 10. All the input ports 9 and all the output ports 10 of the intermediate 6 system are thus preferably monitored by the means for controlling the occurrence of the frames.

In particular, the means for controlling the occurrence of the incoming frames 14 are so arranged as to detect and remove any frame having already been processed by said control means i.e. any frame having already been seen by said control means. It also prevents previously processed frames from being spread. The communication network overload is thus avoided, and more specifically the memory area 13 is not overloaded with previously processed frames.

Similarly, the means for controlling the occurrence of outgoing frames 15 are so arranged as to detect and remove any frame having already been processed by said control means i.e. any frame having already been seen by said control means. This prevents already processed frames from spreading, and thus this avoids overloading the communication network and in particular saturating the output ports 10 with old information.

Similarly, the managing means comprise, for the intermediate system 7, means for controlling the occurrence of the incoming frames 16 and means for controlling the occurrence of the outgoing frames 17 which operate as those of the intermediate system 6.

The switch 5 is thus configured so that all the data frames received correctly (i.e. the properly formatted frames and also the frames not deleted by the means controlling the incoming frames 14 and by the means controlling the occurrence of the incoming frames 16) on the input ports of the switch are stored in the memory area 13 before being transmitted on the output ports of the switch 5.

Furthermore, the managing means comprise, for the intermediate system 6, means for regulating the emission of frames 18 on the output ports 10 of the intermediate system 6 which are arranged further to the means controlling the occurrence of the outgoing frames 15.

Such control means are configured to work here in compliance with a law regulating the emission of frames on the output ports 10 of the first-in, first-out (better known by the acronym FIFO First in, First Out) type.

The means regulating the emission of frames 18 are preferably parameterizable, and the regulation law is therefore also parameterizable. Preferably, the means regulating the emission of frames 18 can be parameterized on a port per port basis. The regulation law is parameterizable as regards the maximum number of bytes per frame or the maximum size of a frame, the minimum time that must elapse between two successive orders of emission of frames on the output ports 10, a number of frames in the order of transmission . . . . For example, the law can thus authorize the regulation of the frames on the output ports 10 based on the emission of only one frame of the maximum size in the order of emission or based on the emission of several frames in the order of emission within a limit of a maximum number of frames and/or a maximum number of bytes in the order of emission.

Said regulating means 18 are so configured as to regulate the frames from the communication system with a central architecture and to the communication system with a distributed architecture 2 only. The frames circulating within the communication system with a distributed architecture 2 are thus not subject to said regulation means 18.

Similarly, the managing means comprise, for the intermediate system 7, means for regulating the emission of frames 19 arranged following the means for controlling the occurrence of the outgoing frames 17, regulating means operating similarly to those of the intermediate system 6 with the difference that said regulating means manage here in a configurable and activatable, port per port, way all the output ports 12 connected to said intermediate system 7 (whereas for the intermediate system 6 the means for regulating the emission of frames 18 manage the frames only, and the associated logical communication channels, circulating from the communication system with a central architecture to the communication system with a distributed architecture).

The switch 5 is for instance a so-called A664 switch (i.e. based on the ARINC 664 standard), the original structure of which has been adapted so that the switch 5 can provide the functions of intermediate system for both types of communication systems.

The switch 5 is preferably so configured that the frame format for the exchange of data in the communication system with a central architecture is duplicated for the communication system with a distributed architecture 2. Thus, the communication system with a distributed architecture 2 is also compatible with the A664 standard. A strict continuity of the logical channels A664 is thus provided from one system to another.

It should be noted that the ports of the switch 5 can equally be connected either to the central communication system or to the distributed communication system 2. An initial setting assigning the different ports of the switch 5 to either communication systems is sufficient to provide a proper routing of the different frames. The ports of the switch 5 can thus have an identical structure.

The switch 5 is therefore flexible and can be reconfigured.

One operating mode of the communication network will now be described while referring to FIGS. 1 and 2. In this operating mode, data is transmitted from the computing unit 1 to the communication system with a distributed architecture. Of course, this implementation is not exhaustive and other types of data exchange can be made with this communication network as described below.

The computing device 1 first generates, via one of the particular application-function 3, instructions containing given information. The connection unit 4 then translates this monitoring instruction into a format suitable for the switch as for example a SNMP (Simple Network Management Protocol) or TFTP (Trivial File Transfer Protocol) format and transmits same to the switch 5.

The translated instruction thus reaches the router 8 at one of the input ports 11 of the intermediate system 7 of the communication system with a central architecture.

The instruction is first controlled by the means controlling the occurrence of the incoming frames 16 before being stored on the memory area 13. The instruction is then sent to the means for controlling the occurrence of the outgoing frames 17, then to the means for regulating the emission of frames 18 before being transmitted via one or more of the output ports 10 of the intermediate system 6 to the communication system with a distributed architecture.

Similarly, the following data exchanges can be executed within the communication network directly from the same switch 5:

of the communication system with a central architecture to the communication system with a distributed architecture 2, of the communication system with a distributed architecture 2 to the communication system with a central architecture, of the communication system with a distributed architecture 2 to the communication system with a distributed architecture 2, of the communication system with a central architecture to the communication system with a central architecture, of the communication system with a distributed architecture 2 to the communication system with a distributed architecture 2 and the communication system with a central architecture, of the communication system with a central architecture to the communication system with a distributed architecture 2 and to the communications system with a central architecture.

The switch 5 thus has logical channels enabling a local transit (passage of data only within a single communication system), a remote transit {passage of data between two different communication systems only) and a mixed transit (passage of data both between two different communication systems and within the same system).

All inter-communication systems and intra-communication systems exchanges are thus supported by the same switch 5 without modification of the data frames regardless of the path taken by the frames (no fragmentation of the frames, no change in the headers of the frames . . . ).

Figure 3:
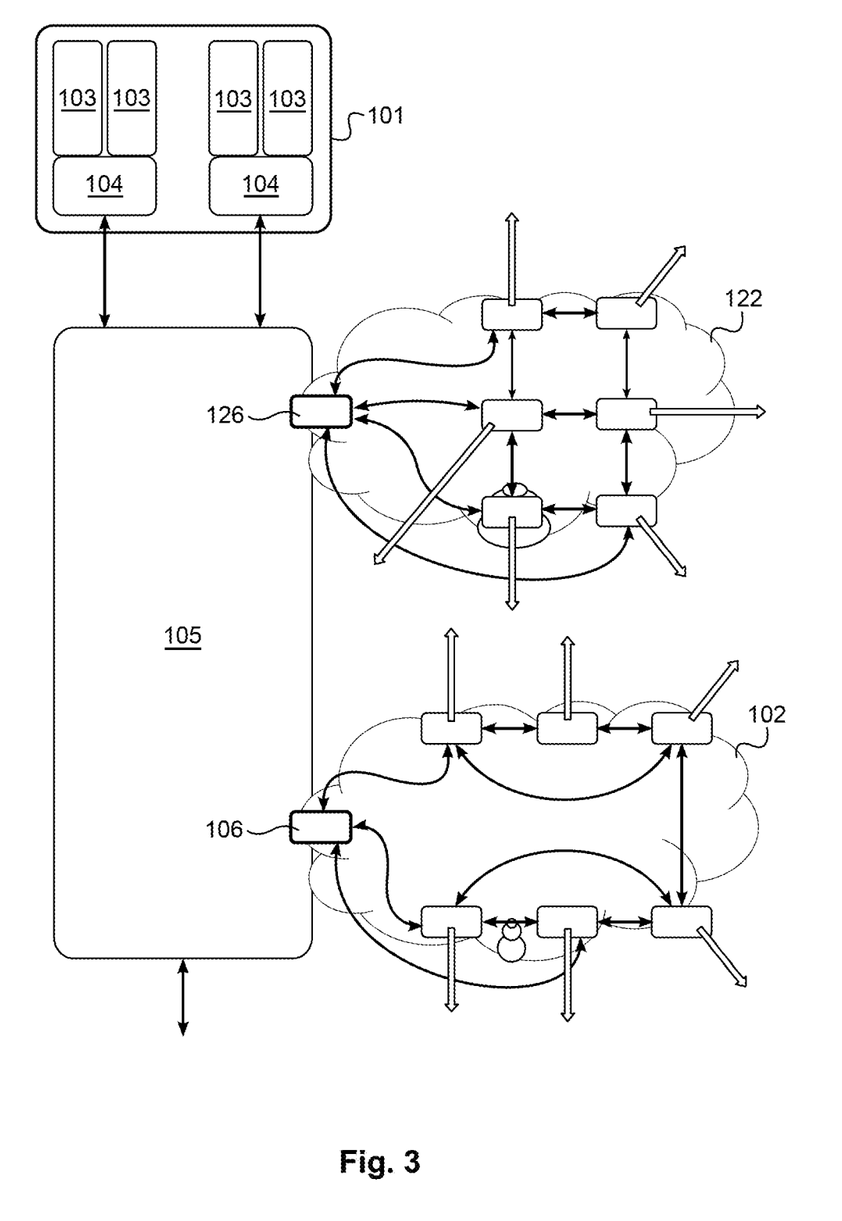

Referring to FIG. 3, the communication network according to the second embodiment of the invention is identical with the communication network according to the first embodiment except that the communication network comprises this time two communication systems with a distributed architecture 102, 122 in addition to the system with a central architecture.

The switch 105 thus comprises a first intermediate system 106 for the first communication system with a distributed architecture 102 and a second intermediate system 126 for the second communication system with a distributed architecture 122. Of course, the switch 105 also comprises an intermediate system (not shown here) connected to the communications system with a central architecture.

Thus, in this embodiment, the switch 105 enables the exchanges within the communication system with a central architecture, within the first communication system with a distributed architecture 102, within the second communication system with a distributed architecture 122 but also:

between the communication system with a central architecture and the first communication system with a distributed architecture 102 and/or the second communication system with a distributed architecture 122, between the first communication system with a distributed architecture 102 and the communication system with a central architecture and/or the second communication system with a distributed architecture 122, between the second communication system with a distributed architecture 122 and the communication system with a central architecture and/or the first communication system with a distributed architecture 102.

In particular, the intermediate system 106 and/or the intermediate system 126 may include means for regulating the outgoing frames on the corresponding communication system with a distributed architecture as in the first embodiment. In this case, either both communication systems with a distributed architecture share the same settings for their regulation law and then the regulation means are so configured as to regulate the frames from the communication system with a central architecture and to the corresponding communication system with a distributed architecture (with the frames circulating within the corresponding communication system with a distributed architecture or between the two communication systems with a distributed architecture then not being subject to said regulating means) or both communication systems with a distributed architecture share the same settings for their regulation law and then the regulation means are so configured as to regulate the frames from the communication system with a central architecture and to the corresponding communication system with a distributed architecture as well as the frames from the other communication system with a distributed architecture and to the corresponding communication system with a distributed architecture (only the frames circulating in the corresponding communication system with a distributed architecture then not being subject to said regulating means).

Figure 4:
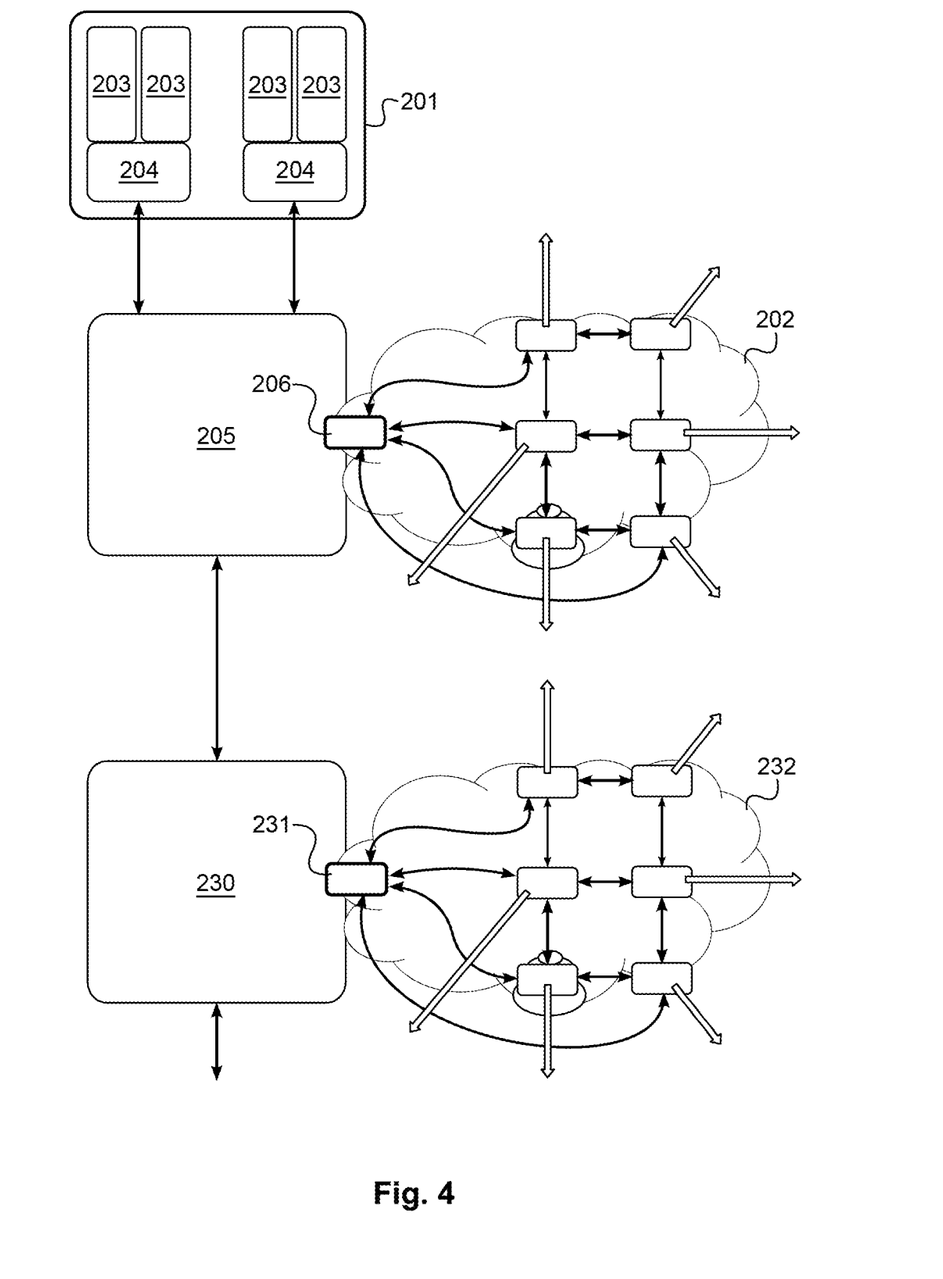

Referring to FIG. 4, the communication network according to the third embodiment of the invention is identical with the communication network according to the first embodiment except that the communication network comprises this time two switches 205 and 230 and two communication systems with a distributed architecture 202, 232.

The first switch 205 is, like the first embodiment, directly connected, on the one hand to the computing unit 201 and, on the other hand, to the first communication system with a distributed architecture 202 via the intermediate system 206 of the first switch 205.

The second switch 230 is connected directly to the first switch 205 and on the other hand, connected directly to the user terminals (not shown here). The second switch 230 thus belongs to the communication system with a central architecture of the first switch 205.

The second switch 230 is also directly connected to the second communication system with a distributed architecture 232 via the intermediate system 231 of the second switch 230.

In addition, each of the switches 205, 230 comprises an intermediate system connected to the communication system with a central architecture at the input and output ports of the switch considered.

The communication network thus comprises a communication system with a central architecture and two communication systems with a distributed architecture independently connected to a respective one of the switches of the communication network.

The network makes it possible to provide for exchanges not only within the communication system with a central architecture, within the first communication system with a distributed architecture 202, within the second communication system with a distributed architecture 232, but also:

between the communication system with a central architecture and the first communication system with a distributed architecture 202 and/or the second communication system with a distributed architecture 232, between the first communication system with a distributed architecture 202 and the communication system with a central architecture and/or the second communication system 232 with a distributed architecture, between the second communication system with a distributed architecture 232 and the communication system with a central architecture and/or the first communication system with a distributed architecture 202.

Figure 5:
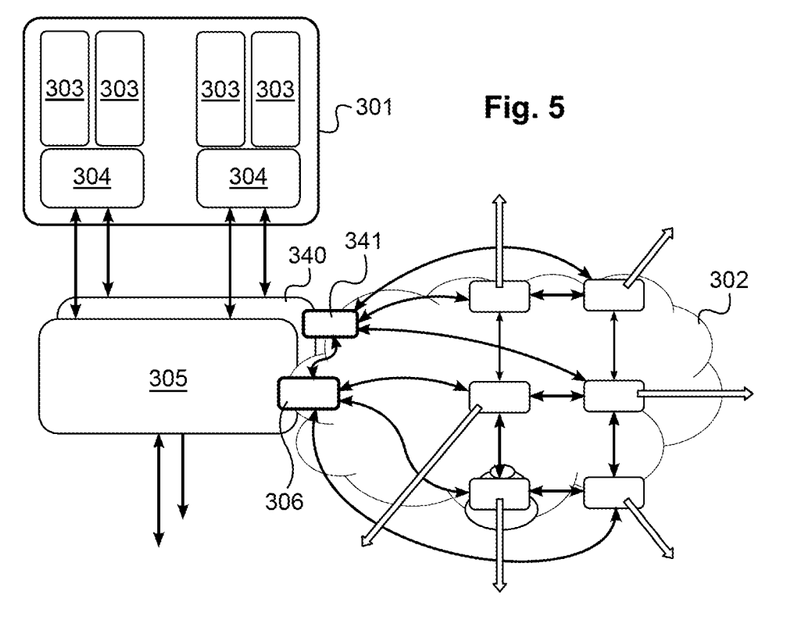

Referring to FIG. 5, the communication network according to the fourth embodiment of the invention is identical with the communication network according to the first embodiment except that the communication network with the central architecture this time comprises two switches 305 and 340 working in parallel for reasons of redundancy.

Each switch 305, 340 is thus independently connected to the communication systems with a distributed architecture 2 via a dedicated intermediary system 306, 341. The data frames from the communication system with a central architecture 302 and the communication systems with a distributed architecture are thus systematically sent to the two switches 305, 340 and vice versa.

Figure 6:
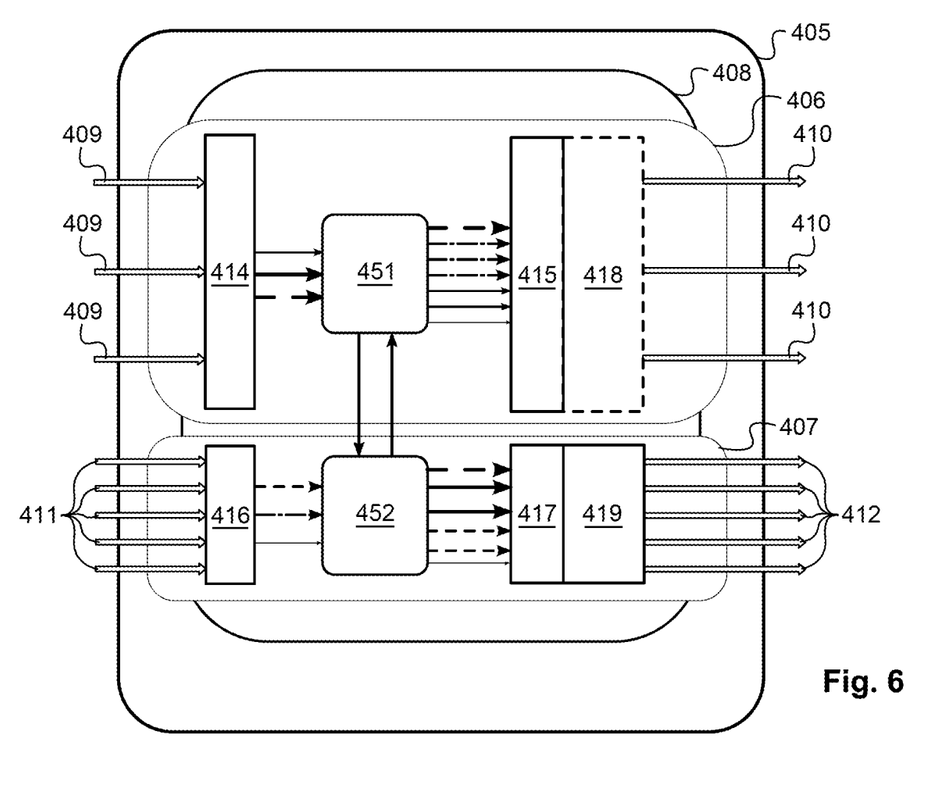

Referring to FIG. 6, the communication network according to the fifth embodiment of the invention is identical with the communication network according to the first embodiment except that the switch 405 is configured differently.

As a matter of fact, here, the memory area is no longer central, i.e. common to the various input and output ports of the switch 405, but is distributed, i.e. the memory area includes as many memory sub-areas as intermediate systems of the switch 405.

In the present case, the memory area comprises a first memory sub-area 451 associated with the first intermediate system 406 in which the data frames received on the input ports 9 are stored and a second memory sub-area 452 associated with the second intermediate system 407 in which the data frames received on the input ports 11 are stored. The two memory sub-areas 451, 452 then communicate with each other so that the data frames can be re-transmitted on the target output ports of the switch so that the switch operates in store and forward mode.

The invention is not limited to what has just been described, but encompasses every alternative solution within the scope of the claims.

In particular, the communications network may have a different number of computing units than what has been provided for.

Similarly, the number of switches and/or the number of communication systems with a distributed architecture may be different from what has been described. There will be as many intermediate systems of the switch as communication systems with a distributed architecture.

Although here the number of switch ports associated with the communication system with a distributed architecture is three, this number may of course be different.

The invention claimed is:

1. A communication network for an aircraft, comprising:
a computing unit;
a switch connected to the computing unit;
a user terminal connected to the switch in such a way that the computing unit, the switch and the user terminal form a communication system with a central architecture, at least one communication system with a distributed architecture that is connected to the switch, with the switch being so designed to be used as an intermediate system for the communication system with the central architecture as well as for the communication system with the distributed architecture, with a portion of the input ports thereof and a portion of the output ports thereof being dedicated to an exchange of data with the communication system with the distributed architecture and a portion of the input ports thereof and a portion of the output ports thereof being dedicated to an exchange of data with the communication system with the central architecture, with the switch comprising a memory area in which all the data frames received on the input ports thereof prior to being retransmitted on the output ports of the switch are stored, with the switch being so configured as to operate in store and forward mode, with the switch thus providing an exchange of data within the communication system with the central architecture, within the communication system with the distributed architecture and between the communication system with the central architecture and the communication system with the distributed architecture, wherein the input and output ports of the switch are distributed among the two communication systems and are used individually by one of the two communications systems only, wherein the ports of the switch can equally be connected either to the communication system with the central architecture or to the communication system with the distributed architecture, wherein the switch is flexible and reconfigurable, wherein the switch comprises means for managing data frames via the switch, with the managing means comprising:

means for controlling the occurrence of the incoming frames which are arranged between the input ports of the switch associated with the communication system with the distributed architecture and the memory area, means for controlling the occurrence of the incoming frames which are arranged between the input ports of the switch related to the communication system with the central architecture and the memory area, means for controlling the occurrence of outgoing frames which are arranged between the memory area and the output ports related to the communication system with the distributed architecture, means for controlling the occurrence of outgoing frames which are arranged between the memory area and the output ports related to the communication system with the central architecture, wherein the managing means comprise:

first regulating means for regulating the emission of frames on the output ports of the switch related to the communication system with the distributed architecture, with said first regulating means being arranged following the means for controlling the occurrence of outgoing frames related to the communication system with the distributed architecture, second regulating means for regulating the emission of frames on the output ports of the switch related to the communication system with the central architecture, with said second regulating means being arranged following the means for controlling the occurrence of outgoing frames related to the communication system with the central architecture, at least one of the first regulating means and the second regulating means being parameterizable, wherein first regulating means and/or second regulating means being parameterizable on a port per port basis.

2. The communication network for an aircraft according to claim 1, further comprising a second communication system with the distributed architecture, with the switch being so arranged as to be used as the intermediate system for the first communication system with the distributed architecture, for the second communication system with the distributed architecture and for the communication system with the central architecture, with a portion of the input ports and a portion of the output ports of the switch being dedicated to a data exchange with the first communication system with the distributed architecture, with a portion of the input ports and a portion of the output ports of the switch being dedicated to an exchange of data with the second communication system with the distributed architecture and the portion of the input ports and the portion of the output ports of the switch being dedicated to an exchange of data with the system with a central architecture.

3. The communication network for an aircraft according to claim 1, comprising a second switch and a second communication system with the distributed architecture, with the first switch being so arranged as to be used as the intermediate system for the first communication system with the distributed architecture and the communication system with the central architecture, with a portion of the input ports and a portion of the output ports of the first switch being dedicated to an exchange of data with the first communication system with the distributed architecture and with the portion of the input ports and the portion of the output ports of the first switch being dedicated to an exchange of data with the system with the central architecture, with the second switch being so arranged as to be used as the intermediate system for the second communication system with the distributed architecture and the communication system with the central architecture, with the portion of the input ports and the portion of the output ports of the second switch being dedicated to an exchange of data with the second communication system with the distributed architecture and the portion of the input ports and the portion of the output ports of the second switch being dedicated to an exchange of data with the with the central architecture.

4. The communication network for an aircraft according to claim 1, wherein the memory area is central within the switch so that all data frames received on the input ports of the switch are stored in the memory area before being retransmitted on the output ports of the switch which ensures the integrity of each received frame.

5. The communication network for an aircraft according to claim 1, wherein all input and output ports are distributed among the two communication systems, with no port of the switch thus remaining unused.

* * * * *